United States Patent
Yoon

(10) Patent No.: US 12,021,236 B2
(45) Date of Patent: Jun. 25, 2024

(54) COMPOSITION FOR COATING A NEGATIVE ELECTRODE ACTIVE MATERIAL, NEGATIVE ELECTRODE ACTIVE MATERIAL AND NEGATIVE ELECTRODE FOR LITHIUM SECONDARY BATTERY INCLUDING THE SAME

(71) Applicant: LG CHEM, LTD., Seoul (KR)

(72) Inventor: Ji Hee Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 814 days.

(21) Appl. No.: 17/048,913

(22) PCT Filed: May 9, 2019

(86) PCT No.: PCT/KR2019/005542
§ 371 (c)(1),
(2) Date: Oct. 19, 2020

(87) PCT Pub. No.: WO2019/216658
PCT Pub. Date: Nov. 14, 2019

(65) Prior Publication Data
US 2021/0159503 A1 May 27, 2021

(30) Foreign Application Priority Data
May 9, 2018 (KR) .......... 10-2018-0053095

(51) Int. Cl.
*H01M 4/62* (2006.01)
*C01B 33/113* (2006.01)
(Continued)

(52) U.S. Cl.
CPC ............. *H01M 4/62* (2013.01); *C01B 33/113* (2013.01); *H01M 4/386* (2013.01);
(Continued)

(58) Field of Classification Search
CPC .... H01M 4/62; H01M 4/386; H01M 10/0525; H01M 2004/027; H01M 4/134;
(Continued)

(56) References Cited

U.S. PATENT DOCUMENTS 6,335,114 B1   1/2002   Ueshima et al.
2017/0047584 A1   2/2017   Hwang et al.

FOREIGN PATENT DOCUMENTS

CN   106084215 A   11/2016
CN   106310977 A   1/2017
(Continued)

OTHER PUBLICATIONS

Liao et al., "Core-shell nano-structured carbon composites based on tannic acid for lithium-ion batteries", Journal of Materials Chemistry A, vol. 4, 2016, pp. 17215-17224 (Year: 2016).*

(Continued)

*Primary Examiner* — Daniel S Gatewood
(74) *Attorney, Agent, or Firm* — Birch, Stewart, Kolasch & Birch, LLP

(57) ABSTRACT

A composition for coating a negative electrode active material, a negative electrode active material for a secondary battery, a negative electrode containing the same, and a lithium secondary battery containing the negative electrode. The composition for coating a negative electrode active material, includes tannic acid, a negative electrode active material for a secondary battery whose surface is coated with a tannic acid-based coating film, a negative electrode for a secondary battery, which includes the negative electrode active material, and a lithium secondary battery including the negative electrode may reduce volume expansion and prevent damage in charging/discharging of the negative electrode active material. Therefore, the secondary battery (Continued)

including the negative electrode ultimately improves resistance and life span characteristics.

5 Claims, 2 Drawing Sheets

(51) Int. Cl.
    *H01M 4/02*            (2006.01)
    *H01M 4/38*            (2006.01)
    *H01M 10/0525*       (2010.01)

(52) U.S. Cl.
    CPC ...... *C01P 2004/50* (2013.01); *C01P 2006/40* (2013.01); *H01M 2004/027* (2013.01); *H01M 10/0525* (2013.01)

(58) Field of Classification Search
    CPC ...... H01M 4/1395; H01M 4/366; H01M 4/36; H01M 4/38; H01M 4/625; H01M 4/485; C01B 33/113; C01P 2004/50; C01P 2006/40; Y02E 60/10
    See application file for complete search history.

(56) References Cited

FOREIGN PATENT DOCUMENTS

| | | |
|---|---|---|
| CN | 107381580 A | 11/2017 |
| JP | 2001-93583 A | 4/2001 |
| JP | 2015-210962 A | 11/2015 |
| KR | 10-1190364 B1 | 10/2012 |
| KR | 10-2015-0128430 A | 11/2015 |
| KR | 10-2015-0128432 A | 11/2015 |
| KR | 10-2015-0128592 A | 11/2015 |
| KR | 10-2018-0056375 A | 5/2016 |
| KR | 10-2016-0092862 A | 8/2016 |
| KR | 10-1682138 B1 | 1/2017 |
| KR | 10-1705594 B1 | 2/2017 |

OTHER PUBLICATIONS

Saowalak et al., "Iron(III)-Tannic Molecular Nanoparticles Enhance Autophagy effect and T1 MRI Contrast in Liver Cell Lines", Scientific Reports, vol. 8, Apr. 27, 2018, Article No. 6647, pp. 1-13 (Year: 2018).*
Gao et al., "Large Pore Mesoporous Silica Nanoparticles by Templating with a Nonsurfactant Molecule, Tannic Acid", Chemistry of Materials, vol. 26, 2014, pp. 2030-2037.
International Search Report issued in PCT/KR2019/005542 (PCT/ISA/210), dated Aug. 14, 2019.
Liao et al., "Core-shell nano-structured carbon composites based on tannic acid for lithium-ion batteries", Journal of Materials Chemistry A, vol. 4, 2016, pp. 17215-17224 (inner pp. 1-11).
Saowalak et al., "Iron(III)-Tannic Molecular Nanoparticles Enhance Autophagy effect and $T_1$ MRI Contrast in Liver Cell Lines", Scientific Reports, vol. 8, Apr. 27, 2018, Article No. 6647, pp. 1-13.
Shagholani et al., "Investigation of tannic acid cross-linked onto magnetite nanoparticles for applying in drug delivery systems", Journal of Drug Delivery Science and Technology, vol. 39, 2017, pp. 88-94.
Uematsu et al., "Preparation and its Corrosion Resistance of Cross-linked Tannic Acid Coating on Zinc Plating", Journal of The Surface Finishing Society of Japan, vol. 58, No. 12, 2007, pp. 858-859.
Fan et al., "Green coating by coordination of tannic acid and iron ions for antioxidant nanofiltration membranes," RSC Advances, vol. 5, No. 130, Dec. 14, 2015, pp. 107777-107784, XP055797283, GB, ISSN: 2046-2069, DOI: 10.1039/C5RA23490E.
Partial Supplementary European Search Report for European Application No. 19800308.9, dated May 3, 2021.
Zhang et al., "Hydrophilic modification of PVDF porous membrane via a simple dip-coating method in plant tannin solution," RSC Advances, vol. 6, No. 75, Jul. 11, 2016, pp. 71287-71294, XP055797274, GB, ISSN: 2046-2069, DOI: 10.1039/C6RA13634F.

* cited by examiner

[FIG. 1]
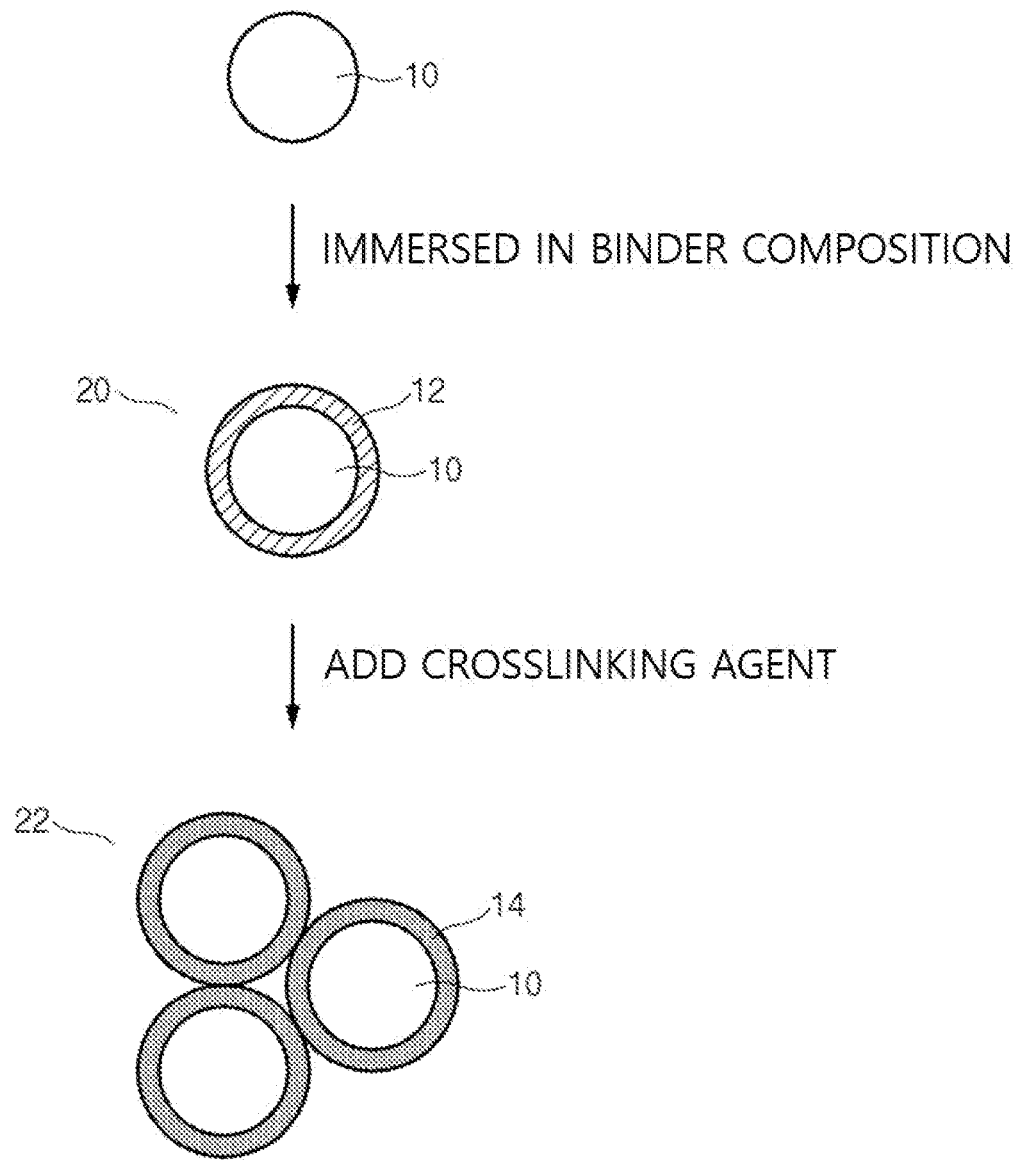

[FIG. 2]
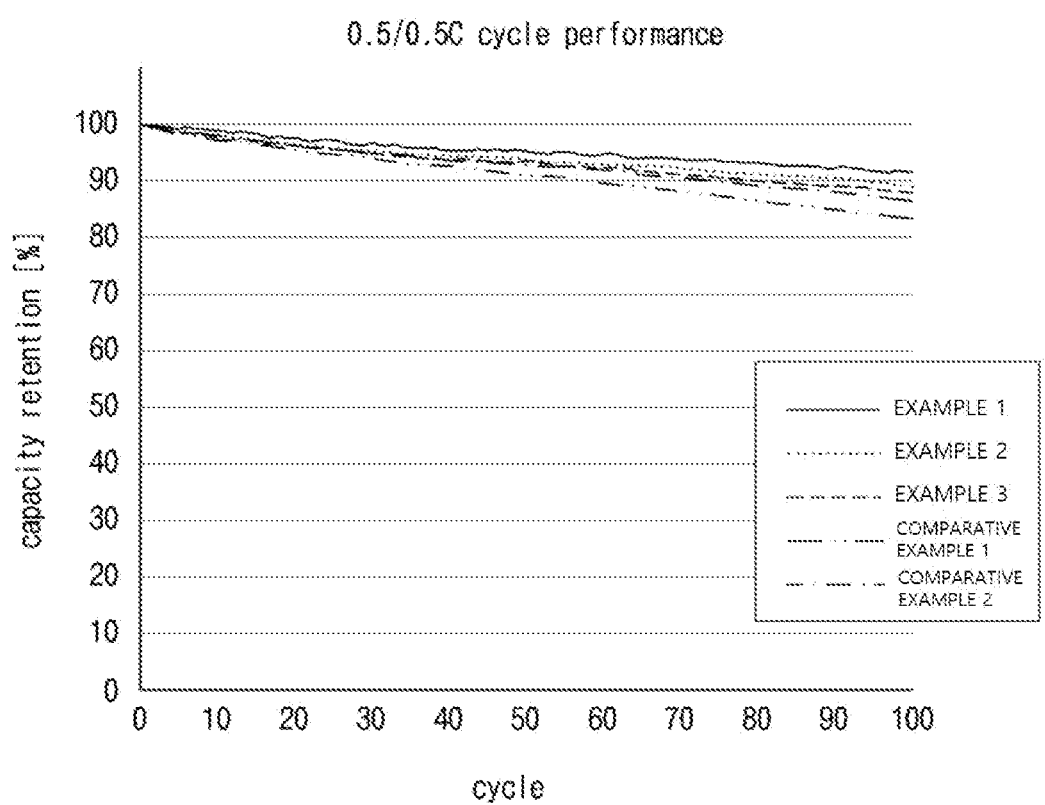

COMPOSITION FOR COATING A NEGATIVE ELECTRODE ACTIVE MATERIAL, NEGATIVE ELECTRODE ACTIVE MATERIAL AND NEGATIVE ELECTRODE FOR LITHIUM SECONDARY BATTERY INCLUDING THE SAME

CROSS-REFERENCE TO RELATED APPLICATION

This application claims priority to and the benefit of Korean Patent Application No. 10-2018-0053095, filed on May 9, 2018, the disclosure of which is incorporated herein by reference in its entirety.

TECHNICAL FIELD

The present invention relates to a composition for coating a negative electrode active material, a negative electrode active material for a secondary battery, a negative electrode containing the same, and a lithium secondary battery including the negative electrode. Particularly, the present invention relates to a composition for coating a negative electrode active material containing tannic acid, a negative electrode active material for a secondary battery whose surface is coated with a tannic acid-based coating film, a negative electrode for a secondary battery, which includes the negative electrode active material, and a lithium secondary battery including the negative electrode.

BACKGROUND ART

According to the increase in the development and demand for mobile devices, the demand for a secondary battery as an energy source is rapidly increasing, and among secondary batteries, a lithium secondary battery which exhibits a high energy density and a high action potential, and has a longer life span and a low self-discharge rate has been commercialized and widely used.

In addition, recently, as environmental concerns increase, there is a lot of research on electric vehicles (EVs) or hybrid electric vehicles (HEVs), which can replace vehicles using fossil fuel such as gasoline vehicles, diesel vehicles, etc., which is one of the main causes of air pollution.

These EVs and HEVs use a nickel-metal hydride (Ni-MH) battery or a lithium battery having a high energy density, a high discharge voltage and high output stability as a power source. Since a lithium secondary battery used in EVs should have a high energy density and a large output in a short time, and should be used for 10 years or longer under harsh conditions, much higher energy density and safety and a much longer life span than a conventional small lithium secondary battery are inevitably required.

Meanwhile, as a positive electrode active material constituting a positive electrode of a lithium secondary battery, a metal oxide such as $LiCoO_2$, $LiMnO_2$, $LiMn_2O_4$ or $LiCrO_2$ is used, and as a negative electrode active material constituting a negative electrode, a material such as a metal lithium, a carbon-based material, for example, graphite or activated carbon, or silicon oxide ($SiO_x$) is used. Among the negative electrode active materials, while metal lithium was mainly used initially, with the progression of charge/discharge cycles, a phenomenon in which lithium atoms grow on the surface of the metal lithium, thereby damaging a separation membrane and a battery occurs, and therefore, recently, a carbon-based material is generally used. However, although a theoretical capacity is approximately 400 mAh/g, a carbon-based material has a small capacity.

For this reason, various studies for replacing the carbon-based material using silicon (Si) having a theoretical capacity (4,200 mAh/g) as a negative electrode active material are progressing. The reaction equation when lithium is intercalated into silicon is as follows:

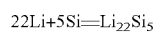  [Reaction Equation 1]

However, most silicon negative electrode materials have a disadvantage in that a silicon volume increases by up to 300% due to lithium intercalation and a negative electrode is broken, and therefore a high cycling characteristic is not obtained. In addition, in the case of silicon, as the cycle continues, volume expansion caused by lithium intercalation may occur, and fading mechanisms such as pulverization, contact losses with conducting agents and current collectors, and formation of an unstable solid-electrolyte-interphase (SEI) may be generated.

For this reason, to solve the above-described problems, various studies are being conducted.

PRIOR ART DOCUMENT

[Patent document]
Korean Patent No. 1705594

DISCLOSURE

Technical Problem

Since a silicon-based negative electrode active material is easily broken or destroyed due to an increased silicon volume in charging/discharging, in order to solve a problem of a reduced life span, the present invention is directed to providing a coating composition that can reducing the volume expansion of a silicon-based negative electrode active material, a negative electrode active material, a negative electrode for a secondary battery, which contains the same, and a secondary battery including the negative electrode.

Technical Solution

To solve the above-described problem, the present invention provides a composition for coating a negative electrode active material, which includes tannic acid and a buffer solution, wherein the tannic acid is present in an amount of 0.01 parts by weight to 1 part by weight with respect to 100 parts by weight of the buffer solution.

The buffer solution has a pH of 7 to 8.5, and may be a Tris buffer solution.

The composition for coating a negative electrode active material may be used as a composition for coating a silicon-based negative electrode active material of a secondary battery using a silicon-based negative electrode active material.

The present invention also provides a negative electrode active material for a secondary battery, which includes a secondary particle formed by agglomerating primary particles. A tannic acid-based coating film is formed on the surface of the primary particles, and the secondary particle is formed by agglomerating the primary particles through crosslinking between the tannic acid coating films formed on the surfaces of the primary particles.

The negative electrode active material may be a silicon-based negative electrode active material.

The present invention also provides a method of preparing the negative electrode active material for a secondary battery, which includes: preparing a composition for coating the negative electrode active material by mixing tannic acid and a buffer solution; obtaining the plurality of primary particles with the tannic acid-based coating film by forming the tannic acid-based coating film on a surface of each of the primary particles by immersing the primary particles in the composition for coating the negative electrode active material; and obtaining the secondary particle by agglomerating the primary particles by adding a crosslinking agent to the solution in which the primary particles with the tannic acid-based coating film are immersed, wherein the tannic acid is mixed at 0.01 part by weight to 1 part by weight with respect to 100 parts by weight of the buffer solution.

The crosslinking agent may be a compound comprising a trivalent metal ion, and the trivalent metal ion may be $Fe^{3+}$, $Al^{3+}$, $Ga^{3+}$, $In^{3+}$ and $Sc^{3+}$.

The present invention also provides a negative electrode for a secondary battery, which includes the negative electrode active material for a secondary battery.

The present invention also provides a secondary battery including the above-described negative electrode for a secondary battery.

Advantageous Effects

The present invention provides a negative electrode active material for a secondary battery whose surface is coated with a tannic acid-based coating film using a composition for coating a negative electrode active material, which contains tannic acid, and the negative electrode active material can reduce the volume expansion and prevent damage to the negative electrode active material in charging/discharging due to the tannic acid-based coating film.

Therefore, a secondary battery including a negative electrode of the present invention ultimately improves resistance and life span characteristics.

DESCRIPTION OF DRAWINGS

FIG. 1 is a schematic diagram illustrating the process of preparing a negative electrode active material of the present invention.

FIG. 2 is a graph illustrating a result obtained according to Experimental Example 1.

MODES OF THE INVENTION

Hereinafter, the present invention will be described in further detail.

Hereinafter, the present invention will be described in further detail to help understanding of the present invention. Here, terms and words used in the specification and claims should not be construed as limited to general or dictionary meanings, and should be interpreted with the meaning and concept in accordance with the technical idea of the present invention based on the principle that the inventors have appropriately defined the concepts of terms in order to explain the invention in the best way.

Coating Composition

The composition for coating a negative electrode active material of the present invention contains tannic acid and a buffer solution.

The tannic acid may be present in an amount of 0.01 parts by weight to 1 part by weight with respect to 100 parts by weight of the buffer solution.

When the tannic acid is present in an amount of less than 0.01 part by weight with respect to 100 parts by weight of the buffer solution, it is difficult to sufficiently coat the surface of a negative electrode active material with the composition for coating a negative electrode active material, and the tannic acid exhibits an insignificant effect of controlling a volume change in the negative electrode active material when being used as a coating component. When the tannic acid is contained at more than 1 part by weight, the coating layer is thickly formed on the surface of the negative electrode active material, and thus cell resistance may increase.

Preferably, the tannic acid may be present in an amount of 0.05 to 0.25 part by weight with respect to 100 parts by weight of the buffer solution, and when the negative electrode active material is coated with the above-mentioned content of the composition, the increase in cell resistance may be reduced, and the volume expansion control effect of the negative electrode active material may be maximized.

The buffer solution may have a pH 7 to 8.5, and specifically, pH 7 to 8, and may be a Tris buffer solution. When the pH of the buffer solution is in the above-described range, the tannic acid contained in the coating composition may subsequently form a Tris-complex using a crosslinking agent.

Negative Electrode Active Material

A negative electrode active material of the present invention is a negative electrode active material for a secondary battery, which includes a secondary particle formed by agglomeration of a plurality of primary particles, and a tannic acid-based coating film is present on a surface of each of the primary particles, and wherein the secondary particle is formed by agglomeration of the primary particles through crosslinking between the tannic acid-based coating films formed on the surfaces of each of the primary particles.

The volume expansion and accompanying damage of the negative electrode active material of the present invention in charging/discharging may be controlled at excellent levels due to the tannic acid-based coating film and crosslinking between the films. In addition, in the case of a secondary particle-type negative electrode active material including the tannic acid-based coating film, because of excellent binding strength between the particles, the volume expansion in charging/discharging may be effectively controlled. When the negative electrode active material that has only the tannic acid-based coating film formed on a primary particle is used, the binding strength between the particles is not good, and the effect of controlling volume expansion through the tannic acid-based coating film may not be exhibited.

The plurality of primary particles may be a silicon-based negative electrode active material.

The silicon-based negative electrode active material may be at least one selected from silicon (Si), a silicon-based alloy and a silicon oxide ($SiO_x$, $0<x\leq 2$), and specifically, a silicon oxide ($SiO_x$, $0<x\leq 2$).

A tannic acid-based coating film is formed on the primary particle.

The tannic acid-based coating film may be formed by stirring the above-described composition for coating a negative electrode active material, which contains tannic acid, and the primary particles.

The secondary particles are formed by agglomeration of the primary particles, and specifically, agglomeration through crosslinking formed between the tannic acid-based coating films formed on the surfaces of the primary particles.

The tannic acid-based coating film may form a Tris-complex by forming crosslinking using a crosslinking agent, and such crosslinking can agglomerate the primary particles, thereby forming the secondary particles.

The negative electrode active material may further include a carbonaceous negative electrode active material with the above-described secondary particles.

The carbonaceous negative electrode active material may be at least one selected from the group consisting of artificial graphite, natural graphite, graphitized carbon fiber and amorphous carbon.

The negative electrode active material may contain a carbonaceous negative electrode active material and a silicon-based negative electrode active material at a weight ratio of 99:1 to 50:50, and preferably 95:5 to 80:20.

The negative electrode active material of the present invention may be prepared by the following steps, which will be described with reference to FIG. 1:

preparing a composition for coating the negative electrode active material by mixing tannic acid and a buffer solution (here, the tannic acid is mixed at 0.01 parts by weight to 1 part by weight with respect to 100 parts by weight of the buffer solution);

obtaining the plurality of primary particles with the tannic acid-based coating film 20 by forming the tannic acid-based coating film 12 on a surface of each of the primary particles 10 by immersing the primary particles in the composition of coating the negative electrode active material; and obtaining the secondary particle 22 by agglomerating the primary particles with the tannic acid-based coating film 20 by adding a crosslinking agent to the solution in which the primary particles with the tannic acid-based coating film 22 are immersed.

The crosslinking agent may be a compound comprising a trivalent metal ion, and the trivalent metal ion may be $Fe^{3+}$, $Al^{3+}$, $Ga^{3+}$, $In^{3+}$ and $Sc^{3+}$.

The compound containing a trivalent metal ion may be $Fe_3SO_4$ or $Fe_3Cl_{12}$.

When the primary particle with the tannic acid-based coating film 20 of a negative electrode active material having the tannic acid-based coating film is obtained, and then the crosslinking agent (e.g., $Fe_3SO_4$) is added thereto in the preparation process, tannic acid forms a Tris-complex as shown in Formula 1 below. In this process, the tannic acid in the tannic acid-based coating films forms a complex and thus is crosslinked, thereby forming the secondary particles 22 of a negative electrode active material. The tannic acid-based coating film 12 forms a Tris complex by the crosslinking agent, thereby forming a crosslinked film 14. That is, the tannic acid-based coating films coated on the surfaces of the primary particles form a Tris-complex, and thus the primary particles 20 are agglomerated, resulting in formation of the secondary particles 22.

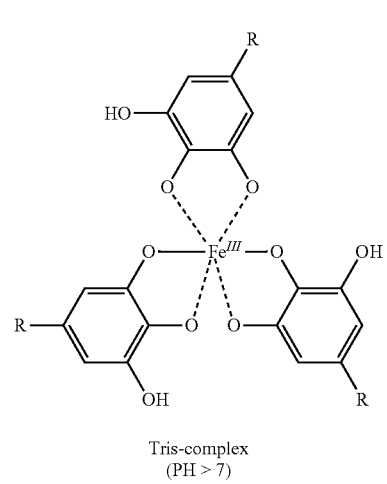

[Formula 1]

Tris-complex
(PH > 7)

In Formula 1, R denotes a residual group of tannic acid.

Negative Electrode and Method of Manufacturing Negative Electrode

The negative electrode of the present invention includes the above-described negative electrode active material of the present invention.

The negative electrode of the present invention may be manufactured by preparing a negative electrode composite material by dissolving or dispersing the above-described negative electrode active material of the present invention, and a conducting agent and/or a binder in a solvent, applying the negative electrode composite material on at least one surface of a negative electrode current collector, and drying and pressing the resulting product, or casting the negative electrode composite material on a separate support and laminating a film obtained by delamination from the support on a negative electrode current collector.

The negative electrode current collector is not particularly limited as long as it does not cause chemical changes in a battery and has high conductivity, and may be, for example, copper, stainless steel, aluminum, nickel, titanium, calcined carbon, copper or stainless steel whose surface is treated with carbon, nickel, titanium or silver, or an aluminum-cadmium alloy. In addition, the negative electrode current collector may generally have a thickness of 3 to 500 μm, and it is possible to form fine irregularities on the surface of the current collector, and thus the binding strength of the negative electrode active material may be enhanced. For example, the negative electrode current collector may be used in various forms such as a film, a sheet, a foil, a net, a porous body, a foamed body, a non-woven fabric, etc.

The negative electrode active material may be contained at 80 to 99 wt %, and more specifically, 85 to 98 wt % with respect to the total weight of the negative electrode active material layer. When the negative electrode active material is contained in the above-described content range, an excellent capacity characteristic may be exhibited.

The conducting agent is used to impart conductivity to an electrode, and thus any one that has electronic conductivity without causing a chemical change in a battery can be used without particular limitation. Specifically, the conducting agent may be graphite such as natural graphite or artificial graphite; a carbon-based material such as carbon black, acetylene black, Ketjen black, channel black, furnace black, lamp black, thermal black or a carbon fiber; a metal powder or metal fiber of copper, nickel, aluminum or silver; a conductive whisker consisting of zinc oxide or potassium titanate; a conductive metal oxide such as titanium oxide; or a conductive polymer such as a polyphenylene derivative, and may be used alone or in a mixture of two or more. The conducting agent may be contained at 1 to 30 wt % with respect to the total weight of the negative electrode active material layer.

In addition, the binder serves to improve the cohesion between the negative electrode active material particles and the binding strength between the negative electrode active material and the current collector. Specifically, an aqueous binder such as styrene butadiene rubber (SBR), carboxymethylcellulose (CMC), starch, hydroxypropylcellulose or regenerated cellulose is preferably used alone or in a mixture of two or more thereof. The binder may be contained at 1 to 30 wt % with respect to the total weight of the negative electrode active material layer.

Meanwhile, the solvent used in the preparation of a negative electrode composite material may be a solvent generally used in the art, and for example, one or a mixture of dimethyl sulfoxide (DMSO), isopropyl alcohol, N-methylpyrrolidone (NMP), acetone or water may be used. The amount of the solvent may be suitably adjusted in consideration of the coating thickness of a slurry, a production yield, a viscosity, etc.

Lithium Secondary Battery

Next, a lithium secondary battery according to the present invention will be described.

A negative electrode containing the above-described negative electrode active material of the present invention may be effectively used in manufacture of a lithium secondary battery.

Specifically, the lithium secondary battery according to the present invention includes a negative electrode, a positive electrode disposed opposite to the negative electrode, a separator interposed between the negative electrode and the positive electrode, and an electrolyte. Here, the negative electrode is a negative electrode manufactured by applying the above-described negative electrode active material of the present invention.

Meanwhile, the secondary battery may further include a battery case accommodating an electrode assembly consisting of the positive electrode, a negative electrode and a separator, and a sealing member for sealing the battery case.

The lithium secondary battery may be manufactured according to a conventional method of manufacturing a secondary battery, except that the negative electrode according to the present invention is used.

In the secondary battery, the positive electrode includes a positive electrode current collector and a positive electrode active material layer disposed on at least one surface of the positive electrode current collector.

The positive electrode may be manufactured according to a conventional method of manufacturing a positive electrode generally known in the art. For example, the positive electrode may be manufactured by preparing a positive electrode composite material by dissolving or dispersing components constituting the positive electrode active material layer, that is, the positive electrode active material, a conducting agent and/or a binder in a solvent, applying the positive electrode composite material on at least one surface of the positive electrode current collector, and drying and pressing the resulting product, or casting the positive electrode composite material on a separate support and laminating a film obtained by delamination from the support on the positive electrode current collector.

The positive electrode current collector is not particularly limited as long as it does not cause chemical changes in a battery and has high conductivity, and may be, for example, stainless steel, aluminum, nickel, titanium, calcined carbon, or aluminum or stainless steel whose surface is treated with carbon, nickel or silver. In addition, the positive electrode current collector may generally have a thickness of 3 to 500 μm, and fine irregularities may be formed on the surface of the current collector, thereby increasing the binding strength with the positive electrode active material. For example, the positive electrode current collector may be used in various forms such as a film, a sheet, a foil, a net, a porous body, a foamed body, a non-woven fabric, etc.

The positive electrode active material may be, for example, a layered compound such as lithium cobalt oxide ($LiCoO_2$) or lithium nickel oxide ($LiNiO_2$) or a compound substituted with one or more transition metals; a lithium manganese oxide represented by $Li_{1+y}Mn_{2-y}O_4$ (wherein y is 0 to 0.33), $LiMnO_3$, $LiMn_2O_3$, or $LiMnO_2$; lithium copper oxide ($Li_2CuO_2$); a vanadium oxide such as $LiV_3O_8$, $LiV_3O_4$, $V_2O_5$, or $Cu_2V_2O_7$; an Ni-site lithium nickel oxide represented by $LiNi_{1-y}M_yO_2$ (wherein M=Co, Mn, Al, Cu, Fe, Mg, B or Ga, and y=0.01 to 0.3); a lithium manganese composite oxide represented by $LiMn_{2-y}M_yO_2$ (wherein M=Co, Ni, Fe, Cr, Zn or Ta, y=0.01 to 0.1) or $Li_2Mn_3MO_8$ (wherein M=Fe, Co, Ni, Cu or Zn); $LiMn_2O_4$ in which a part of Li of the formula is substituted with an alkaline earth metal ion; a disulfide compound; or $Fe_2(MoO_4)_3$, but the present invention is not limited thereto.

In addition, the binder and the conducting agent may be the same as described above for the negative electrode.

Meanwhile, in the secondary battery, the separator is not particularly limited as long as it is generally used to separate a negative electrode from a positive electrode and provide a movement path for lithium ions, and is not specifically limited as long as it can be used as a separator in a general secondary battery, and particularly, having a low resistance to ion mobility of an electrolyte and an excellent electrolyte uptake ability. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used as a separator. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

Meanwhile, the electrolyte used in the present invention may be an organic liquid electrolyte, an inorganic liquid electrolyte, a solid polymer electrolyte, a gel-type polymer electrolyte, a solid inorganic electrolyte, or a melt-type inorganic electrolyte, which can be used in manufacture of a lithium secondary battery, but the present invention is not limited thereto.

Specifically, the electrolyte may include an organic solvent and a lithium salt.

The organic solvent is not particularly limited as long as it can serve as a medium enabling the mobility of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as $R_a$—CN ($R_a$ is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate having high ion conductivity and high permittivity to increase the charge/discharge performance of a battery (for example, ethylene carbonate or propylene carbonate) and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance the lifespan characteristic of the battery, inhibit a decrease in battery capacity, and enhance the discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

EXAMPLES

Example 1

[1-1. Preparation of Composition for Coating Negative Electrode Active Material]

A composition for coating a negative electrode active material was prepared by adding 0.1 g of tannic acid to 100 g of a bis-Tris buffer solution (pH 7).

[1-2. Preparation of Negative Electrode Active Material]

SiO primary particles whose surface was coated with tannic acid were obtained by adding 180 mg of a powder of SiO particles ($D_{50}$: 5 μm) to the composition for coating a negative electrode active material prepared in Example 1-1 and stirring the mixture for 12 hours. As a crosslinking agent, an $Fe_3SO_4$ compound was added to the solution containing the tannic acid-coated SiO primary particles. As a result, secondary particles in which the tannic acid-coated SiO particles were agglomerated by forming a tannic acids-crosslinked Tris-complex through bonding the terminal phenol group of tannic acid formed on the SiO surface with a $Fe^{3+}$ ion of a crosslinking agent. Subsequently, an extract was obtained by centrifugation and dried in a 60° C. oven for 6 hours, thereby obtaining a negative electrode active material prepared in the form of secondary particles in which tannic acid-coated SiO primary particles are agglomerated.

[1-3. Manufacture of Negative Electrode]

A negative electrode slurry was prepared by mixing a negative electrode active material prepared by mixing the SiO negative electrode active material prepared in Example 1-2 and graphite at a weight ratio of 10:90, Super C65 as a conducting agent, styrene-butadiene rubber (SBR) as a binder, and carboxymethylcellulose (CMC) as a thickening agent at a weight ratio of 95.6:1:2.3:1.1 and adding water to the resulting mixture.

The slurry was applied to copper foil, vacuum-dried at approximately 130° C. for 8 hours, rolled until a target porosity of 28%, thereby obtaining a negative electrode having an area of 1.4875 $cm^2$ (the area of a part on which the negative electrode slurry was coated). Here, the negative electrode was manufactured to have a load amount of 3.61 $mAh/cm^2$.

[1-4. Manufacture of Secondary Battery]

The negative electrode manufactured in Example 1-3 and a Li metal as a counter electrode were used, and a polyolefin separator was interposed between the negative electrode and the Li metal, thereby manufacturing an electrode assembly.

A non-aqueous electrolyte was prepared by adding 1M $LiPF_6$ to a non-aqueous electrolyte solvent prepared by mixing ethylene carbonate and ethyl methyl carbonate at a volume ratio of 3:7, and then injected into the electrode assembly, thereby manufacturing a coin-type half secondary battery.

Example 2

A composition for coating a negative electrode active material, a negative electrode active material, a negative electrode and a secondary battery were manufactured by the same method as described in Example 1, except that tannic acid was used at a concentration 4-fold that of Example 1 (0.4 g of tannic acid was added to 100 g of a bis-Tris buffer solution (pH 7)) in the preparation of a composition for a negative electrode active material.

Example 3

A composition for coating a negative electrode active material, a negative electrode active material, a negative electrode and a secondary battery were manufactured by the same method as described in Example 1, except that tannic acid was used at a concentration ⅕-fold that of Example 1 (0.02 g of tannic acid was added to 100 g of a bis-Tris buffer solution (pH 7)) in the preparation of a composition for a negative electrode active material.

Comparative Example 1

A negative electrode and a secondary battery were manufactured by the same processes of Examples 1-3 and 1-4, except that the processes of Example 1-1 and 1-2 were omitted and a SiO negative electrode active material which was not coated with tannic acid was used in Example 1-3.

Comparative Example 2

A composition for a negative electrode active material was prepared by the same process of Example 1-1, and tannic acid-coated SiO particles were obtained using the composition as described in Example 1-2. Subsequently, only a process of preparing secondary particles by adding a crosslinking agent was omitted, and the same processes as described in Examples 1-3 and 1-4 were performed, thereby manufacturing a negative electrode and a secondary battery.

Experimental Example 1. Test for Cycling Characteristic

The cycling characteristics of the secondary batteries manufactured in Examples 1 to 3 and Comparative Examples 1 and 2 were tested.

The secondary batteries manufactured in Examples 1 to 3 and Comparative Examples 1 and 2 (battery capacity: 60 mAh) were subjected to 100 charge/discharge cycles at 25° C. at a 1C/1C charge/discharge rate.

Specifically, lithium secondary batteries having a battery capacity of 60 mAh, which was manufactured in Examples 1 to 3 and Comparative Examples 1 and 2, were charged to 4.25 V at 25° C. and a 1C constant current and charged again at a constant voltage of 4.25 V, and then charging was terminated when the charge current reached 5 mA. Afterward, the secondary battery was maintained for 10 minutes, and then discharged until 3 V at a 1C constant current. The charge/discharge behavior was set as one cycle, and such a cycle was repeatedly performed 100 times, and then charge/discharge capacities according to Examples and Comparative Examples were measured. The results are shown in Table 1 below and FIG. 2.

Here, C is a charge/discharge current rate of a battery expressed in amperes (A), that is, C-rate, and generally represented in the ratio of normal battery capacity.

TABLE 1

|  | Example 1 | Example 2 | Example 3 | Comparative Example 1 | Comparative Example 2 |
|---|---|---|---|---|---|
| Capacity retention (%) in 100 cycles | 91.4 | 89.2 | 87.5 | 83.3 | 86.7 |

As shown in Table 1 and FIG. 2, it can be confirmed that the secondary batteries of Examples 1 to 3, containing the negative electrode active material of the present invention, have excellent capacity retention as the cycle repeats, compared with the secondary batteries of Comparative Examples 1 and 2.

Experimental Example 2. Cell Resistance Measuring Test

The cell resistance of the secondary batteries manufactured in Examples 1 to 3 was measured.

The cell resistance was measured with a difference in voltage drop when a secondary battery was charged to SOC 50% and discharged at a current of 2.5C for 30 seconds based on the discharge capacity of the secondary battery. The result is shown in Table 2 below.

TABLE 2

|  | Example 1 | Example 2 | Example 3 |
|---|---|---|---|
| Resistance (ohms) | 1.4875 | 1.5632 | 1.4731 |

Referring to Table 2, it can be seen that Examples 1 to 3 show excellent cell resistances.

Particularly, it can be confirmed that the secondary battery of Example 1 exhibits very excellent cell resistance and capacity retention.

EXPLANATION OF REFERENCE NUMERALS

10: Primary particle
12: Tannic acid-based coating film
14: Crosslinked film of tannic acid-based coating film (the film having Tris-complex of tannic acid)
20: Primary particle with tannic acid-based coating film
22: Secondary particle

The invention claimed is:

1. A negative electrode active material for a secondary battery, comprising
a secondary particle formed by agglomeration of a plurality of primary particles,
wherein the plurality of primary particles comprise a silicon-based negative electrode active material,
wherein a tannic acid-containing coating film present on a surface of each of the primary particles, and
wherein the secondary particle is formed by agglomeration of the primary particles through crosslinking formed between the tannic acid-containing coating films respectively formed on the surface of each of the primary particles.

2. A method of preparing the negative electrode active material for a secondary battery according to claim 1, comprising:
preparing a composition for coating the negative electrode active material by mixing tannic acid and a buffer solution;
obtaining the plurality of primary particles with the tannic acid-containing coating film by forming the tannic acid-containing coating film on a surface of each of the primary particles by immersing the primary particles in the composition for coating the negative electrode active material; and
obtaining the secondary particle by agglomerating the primary particles by adding a crosslinking agent to the solution in which the primary particles with the tannic acid-containing coating film are immersed,
wherein the tannic acid is mixed at 0.01 parts by weight to 1 part by weight with respect to 100 parts by weight of the buffer solution.

3. The method according to claim 2, wherein the crosslinking agent is a compound comprising a trivalent metal ion.

4. The method according to claim 3, wherein the trivalent metal ion is selected from the group consisting of $Fe^{3+}$, $Al^{3+}$, $Ga^{3+}$, $In^{3+}$ and $Sc^{3+}$.

5. A negative electrode for a secondary battery comprising the negative electrode active material for a secondary battery of claim 1.

* * * * *